Oct. 15, 1929.  A. E. ANDERSON ET AL  1,731,918

AUTOMATIC SWITCHING SYSTEM

Filed April 28, 1927

Inventors:
Arvid E. Anderson,
Herman Bany,
by
Their Attorney.

Patented Oct. 15, 1929

1,731,918

UNITED STATES PATENT OFFICE

ARVID E. ANDERSON AND HERMAN BANY, OF SCOTIA, NEW YORK, ASSIGNORS TO GENERAL ELECTRIC COMPANY, A CORPORATION OF NEW YORK

AUTOMATIC SWITCHING SYSTEM

Application filed April 28, 1927. Serial No. 187,401.

Our invention relates to automatic switching systems and particularly to such a system for selectively controlling the connections between two sources of current and a load circuit and one object of our invention is to provide an improved system of this kind.

In accordance with our invention we provide an arrangement whereby the circuit breakers between the two sources and the load circuit are selectively controlled in accordance with the voltages of the two sources and each circuit breaker, when closed, is arranged to be opened upon the occurrence of predetermined abnormal conditions on the load circuit and to be reclosed after it has been open a predetermined interval of time.

Our invention will be better understood from the following description taken in connection with the accompanying drawing and its scope will be pointed out in the appended claims.

Figure 1:
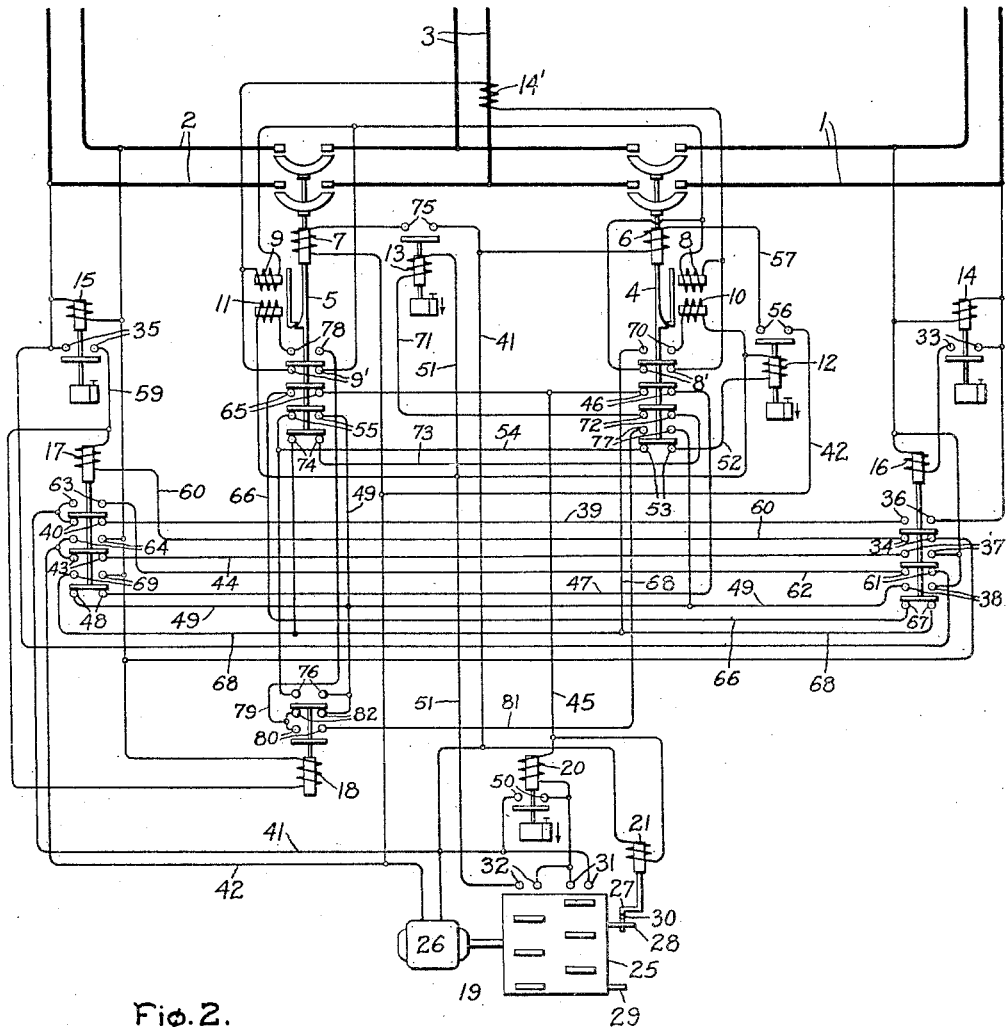
Figure 2:
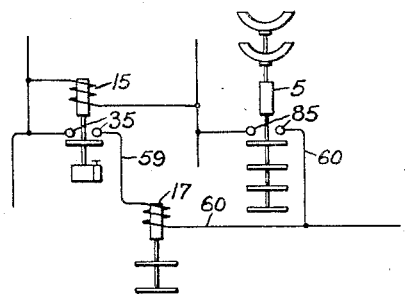

In Fig. 1 of the accompanying drawing we have shown our invention in connection with a switching system for controlling the connections between a preferred source, an emergency source, and a load circuit, and in Fig. 2 we have shown a modification of a portion of the system shown in Fig. 1 whereby the preferred source when reenergized is not reconnected to the load circuit until the emergency source is disconnected from the load circuit either due to its failure or the occurrence of an overload on the load circuit.

Referring to Fig. 1, 1 and 2 represent two sources of alternating current, shown as supply circuits, which are arranged to be connected to a load circuit 3 by the circuit breakers 4 and 5 respectively which may be of any suitable type, examples of which are well-known in the art. As shown, the circuit breakers 4 and 5 are of the well-known latched-in type and are provided with closing coils 6 and 7 respectively, current trip coils 8 and 9 respectively, and voltage trip coils 10 and 11 respectively. The circuits of the closing coils 6 and 7 are respectively controlled by the control relays 12 and 13 which are of the well-known hesitating type whereby they do not open their contacts until after their coils have been deenergized a predetermined length of time. Each of the current trip coils 8 and 9 may be connected in any suitable manner so that it is energized to effect the opening of its respective circuit breaker, when it is closed, and an overload occurs on the load circuit 3. As shown, this result is obtained by connecting the trip coils 8 and 9 in series with the secondary of a current transformer 14' in the load circuit 3. When a predetermined overload occurs on the load circuit 3 the overload trip coil of the closed circuit breaker is sufficiently energized to trip the latch of its respective circuit breaker and effect the opening thereof. The trip coil 8 is arranged to be short-circuited by auxiliary contacts 8' on the circuit breaker 4 when it is open and the trip coil 9 is arranged to be short-circuited by auxiliary contacts 9' on the circuit breaker 5 when it is open.

In order to control the closing of the circuit breakers selectively in accordance with the voltages of the two sources and to effect the reclosure of a circuit breaker after it has been opened by an overload on the load circuit 3, we provide the voltage relays 14 and 15, which are respectively energized in response to the voltages of the circuits 1 and 2, the control relays 16, 17 and 18, which are selectively energized in accordance with the voltages of the circuits 1 and 2, and a timing device 19 and its associated control relay 20 and magnet 21 which are arranged to be operated so as to effect the selective operation of the circuit breakers in accordance with voltage conditions of the sources 1 and 2. While we have shown single phase sources in order to simplify the disclosure, it is obvious that our invention is applicable to polyphase sources and direct current sources.

As shown in Fig. 1, the source 1 is the preferred source and is arranged to be connected to the load circuit whenever the voltage conditions of the source 1 are normal.

The source 2 is the emergency source and is arranged to supply current to the load circuit 3 when the voltage conditions of the preferred source 1 are not normal and the voltage conditions of the emergency source are normal.

Whenever the voltage conditions of the preferred source 1 are normal, the voltage relay 14 and the control relay 16, which is controlled by the voltage relay 14, are energized. The control relay 16 when energized effects the completion of the necessary circuits to cause the timing device 19 to operate and effect the opening of the circuit breaker 5 if it is closed and the closing of the circuit breaker 4 if it is open.

Whenever the voltage conditions of the emergency source 2 are normal the voltage relay 15 is energized, but the control relay 17, which is controlled by relay 15, is not energized unless the control relay 16 is deenergized. The control relay 17 when energized effects the completion of the necessary circuits to cause the timing device 19 to operate and effect the opening of the circuit breaker 4 if it is closed and the closing of the circuit breaker 5 if it is open.

The timing device 19 is also arranged to effect the re-closing of each circuit breaker when it is opened upon the occurrence of an overload on the load circuit 3. The timing device 19 may be of any suitable construction, examples of which are well-known in the art, whereby it effects the completion of a control circuit a predetermined number of times with predetermined intervals of time between successive completions of the control circuit. The particular timing device 19 shown in the drawing is an arrangement well known in the art of automatic reclosing circuit breaker systems. It comprises a timer 25 and a direct connected driving motor 26 therefor. The timer and motor are normally prevented from rotating by a stop 27 which engages a projection 28 on the timer. The stop 27 is arranged to be moved out of engagement with the projection 28 by the magnet 21 when it is energized. The stop 27 is also arranged to engage another projection 29 on the timer when the timer has reached a predetermined position after having effected a predetermined number of closures of the control circuit. This position is called the lock-out position, and when the timer is held in this position, further operation of the timer is prevented. The stop 27 is provided with a groove 30 which is so spaced that the projection 29 is in this groove when the timer is held in its lockout position. Consequently, the subsequent deenergization of magnet 21 does not permit the magnet to return to its deenergized position and thereby allowing the timer to operate after it has been locked out.

The timer 25 is provided with two sets of contacts 31 and 32 which are arranged to be closed in a predetermined sequence as the timer is rotated and in such a manner that only one set is closed at any instant. When the contacts 31 are closed a circuit is completed for the control relay 20 if the proper circuit breaker is not closed. The relay 20 in closing completes a locking circuit for itself so that when the contacts 31 are subsequently opened, the relay 20 remains energized. When the contacts 32 are subsequently closed, the control circuits for effecting the closing and opening of the proper circuit breakers are completed if the control relay 20 is energized.

The operation of the system shown is as follows: It will be assumed that both of the circuit breakers 4 and 5 are open and that the voltages of sources 1 and 2 are restored to normal at the same time. Under these conditions both of the voltage relays 14 and 15 are energized simultaneously and the relay 14 by closing its contacts 33 connects the control relay 16 to the source 1. The relay 16 by opening its contacts 34 which are in the circuit of the relay 17 prevents the relay 17 from being energized. The voltage relay 15, however, by closing its contacts 35 completes the circuit of the control relay 18 across the source 2.

The relay 16 by closing its contacts 36, 37 and 38 completes the necessary circuits for the timing device 19, when the circuit breaker 4 is open, to cause the timing device to operate and effect the closing of this circuit breaker. The circuit of the motor 26 for the timer 25 is completed from one side of the source 1 through contacts 36 of relay 16, conductor 39, contacts 40 of relay 17, conductor 41, motor 26, conductor 42, contacts 43 of relay 17, conductor 44, contacts 37 of relay 16 to the other side of the source 1. The circuit of the release magnet 21 of the timer is from one side of the source 1 through contacts 36 of relay 16, conductor 39, contacts 40 of relay 17, conductor 41, coil of release magnet 21, conductor 45, auxiliary contacts 46 on the circuit breaker 4, conductor 47, contacts 48 of relay 17, conductor 49, contacts 38 of relay 16 to the other side of the source 1. Magnet 21 when energized moves the stop 27 out of engagement with the projection 28 on the timer so that motor 26 is free to rotate the timer 25. After a predetermined time interval the timer 25 completes through its contacts 31 a circuit for the associated control relay 20. This circuit is from one side of the source 1 through contacts 36 of the relay 16, conductor 39, contacts 40 of relay 17, conductor 41, contacts 31 of timer 25, coil of relay 20, conductor 45, auxiliary contacts 46 on circuit breaker 4, conductor 47, contacts 48 of relay 17, conductor 49, contacts 38 of relay 16 to the other side of the source 1. The relay 20 by closing its contacts 50 completes a locking circuit for itself which is independent of the contacts 31 of the timer 25 so that the relay 20 remains energized after the timer 25 opens the circuit through its contacts 31. The timer 25 subsequently completes through its contacts 32 a circuit for the hesitating control relay 12. This circuit is from one side of the source 1, through contacts 36 of relay 16, conductor 39, contacts 40 of relay 17, conductor 41, contacts 50 of relay 20, contacts 32 of timer 25, conductor 51 coil of relay 12, conductor 52, auxiliary contacts 53 on circuit breaker 4, conductor 54, auxiliary contacts 55 on circuit breaker 5, conductor 49, contacts 38 of relay 16 to the other side of the source 1. The hesitating control relay 12 by closing its contacts 56 completes the circuit of the closing coil 6 to close the circuit breaker 4 and connect the preferred source 1 to the load circuit. The circuit of the closing coil 6 is from one side of the source 1 through contacts 36 of relay 16, conductor 39, contacts 40 of relay 17, conductor 41, closing coil 6, conductor 57, contacts 56 of relay 12, conductor 42, contacts 43 of relay 17, conductor 44, contacts 37 of relay 16 to the other side of the source 1.

The circuit breaker 4 by opening its contacts 46 effects the deenergization of the magnet 21 and the control relays 20 and 12. Therefore, if the circuit breaker 4 remains closed further closure of the contacts 31 and 32 while the timer is being returned to its normal position does not effect the reenergization of the control relays 20 and 12 in the manner above described. When the timer reaches its normal position it is stopped in that position by the projection 28 engaging the stop 27 since the release magnet 21 is deenergized.

Let it now be assumed that while the circuit breaker 4 is closed the voltage conditions of the source 1 become abnormal so that relays 14 and 16 become deenergized and that the voltage conditions of the source 2 are normal at that time. As soon as the relay 16 closes its contacts 34, the control relay 17 is energized and effects the operation of the timer 25 to effect the opening of the circuit breaker 4 and the closing of the circuit breaker 5. The circuit of the relay 17 is from one side of the source 2 through contacts 35 of relay 15, coil of relay 17, conductor 60, contacts 34 of relay 16 to the other side of the source 2. The relay 17 when energized completes a circuit for the motor 26 of the timer 25 from one side of the source 2, through contacts 61 of relay 16, conductor 62, contacts 63 of relay 17, conductor 41, motor 26, conductor 42, contacts 64 of relay 17 to the other side of the source 2. A circuit is also completed for the release magnet 21 when the relay 17 is energized and the circuit breaker 5 is open. This circuit is from one side of the source 2 through contacts 61 of relay 16, conductor 62, contacts 63 of relay 17, conductor 41, coil of magnet 21, conductor 45, auxiliary contacts 65 on circuit breaker 5, conductor 66, contacts 67 of relay 16, conductor 68, contacts 69 of relay 17 to the other side of the source 2. The motor 26, therefore, is free to rotate the timer 25. When the timer closes its contacts 31 a circuit is completed for the control relay 20 from one side of the source 2 through contacts 61 of relay 16, conductor 62, contacts 63 of relay 16, conductor 41, contacts 31 of timer 25, coil of relay 20, conductor 45, auxiliary contacts 65 on circuit breaker 5, conductor 66, contacts 67 of relay 16, conductor 68, contacts 69 of relay 17 to the other side of the source 2. The control relay 20 by closing its contacts 50 completes a locking circuit for itself which is independent of the contacts 31 of the timer 25. When the timer 25 subsequently closes its contacts 32, a circuit is first completed for the trip coil 10 of the circuit breaker 4 associated with the preferred source 1 to effect the opening of this circuit breaker and then after the circuit breaker 4 opens a circuit is completed for the hesitating control relay 13 to effect the closing of the circuit breaker 5 so as to connect the emergency source 2 to the load circuit.

The circuit for the trip coil 10 is from one side of the source 2 through contacts 61 of relay 16, conductor 62, contacts 63 of relay 17, conductor 41, contacts 50 of relay 20, contacts 32 of timer 25, conductor 51, trip coil 10 of circuit breaker 4, auxiliary contacts 70 on the circuit breaker 4, conductor 68, contacts 69 of relay 17 to the other side of the source 2. When the circuit breaker 4 opens the circuit of the hesitating control relay 13 is completed from one side of the source 2 through contacts 61 of relay 16, conductor 62, contacts 63 of relay 17, conductor 41, contacts 50 of relay 20, contacts 32 of timer 25, conductor 51, coil of relay 13, conductor 71, auxiliary contacts 72 on the circuit breaker 4, conductor 73, auxiliary contacts 74 on the circuit breaker 5, conductor 68, contacts 69 of relay 17 to the other side of the source 2. The relay 13 by closing its contacts 75 completes a circuit for the closing coil 7 of the circuit breaker 5 from one side of the source 2 through contacts 61 of relay 16, conductor 62, contacts 63 of relay 17, conductor 41, contacts 75 of relay 13, closing coil 7, conductor 42, contacts 64 of relay 17 to the other side of the source 2. The circuit breaker 5 by opening its auxiliary contacts 65 opens the heretofore described circuits for the control relay 20 and release magnet 21 so that, if the circuit breaker 5 remains closed, the timer 25 does not effect any further operation of the circuit breaker 5 while the timer is being restored to its normal position.

It will now be assumed that while the circuit breaker 5 is closed and the source 2 is supplying current to the circuit 3 the voltage conditions of source 1 are restored to normal so that relays 14 and 16 are reenergized. The relay 16 by opening its contacts 34 effects the deenergization of relay 17. As soon as the relay 17 is deenergized the motor operated timer 25 is operated in the manner above described to effect the closing of the circuit breaker 4.

If the sources 1 and 2 are in synchronism, it is desirable to reclose the circuit breaker 4 before the circuit breaker 5 is open so as not to interrupt the supply of current to the load circuit during the transfer from the emergency to the preferred source. We accomplish this result by arranging the circuit of the trip coil 11 so that it is completed when the source 2 is energized and the circuit breaker 4 is closed.

When the timer 25 closes its contacts 32, under the conditions now assumed, to effect the closing of the circuit breaker 4 the circuit of the hesitating control relay 12 is from one side of the source 1 through contacts 36 of relay 16, conductor 39, contacts 40 of relay 17, conductor 41, contacts 50 of relay 20, contacts 32 of timer 25, conductor 51, coil of relay 12, conductor 52, auxiliary contacts 53 on circuit breaker 4, conductor 54, contacts 76 of relay 18, conductor 49, contacts 38 of relay 16 to the other side of source 1.

When the circuit breaker 4 closes to reconnect the preferred source 1 to the load circuit 3 the closing of the auxiliary contacts 77 on the circuit breaker 4 completes a circuit for the trip coil 11 of the circuit breaker 5 from one side of the source 1, contacts 36 of relay 16, conductor 39, contacts 40 of relay 17, conductor 41, contacts 50 of relay 20, contacts 32 of timer 25, conductor 51, trip coil 11, auxiliary contacts 78 on circuit breaker 5, conductor 79, contacts 80 of relay 18, conductor 81, auxiliary contacts 77 on circuit breaker 4, conductor 49, contacts 38 of relay 16 to the other side of the source 1. The relay 20 is preferably arranged so that it has a time delay in opening its contacts 50 and, therefore, does not have time to open its contacts before the above circuit is completed. It will be observed that the circuit of the relay 20 is open when both circuit breakers 4 and 5 are simultaneously closed.

In case, however, the source 1 is reenergized at a time when the circuit breaker 5 is closed and the source 2 is not energized it is desirable not to close the circuit breaker 4 until after the circuit breaker 5 is opened. This result is obtained in the following manner. When the timer 25 closes its contacts 32 a circuit is first completed for the trip coil 11 of the circuit breaker 5 and then a circuit is completed for the control relay 12 to effect the closing of the circuit breaker 4. This circuit of the trip coil 11 is from one side of the source 1 through contacts 36 on relay 16, conductor 39, contacts 40 of relay 17, conductor 41, contacts 50 of relay 20, contacts 32 of timer 25, conductor 51, trip coil 11, auxiliary contacts 78 on the circuit breaker 5, conductor 79, contacts 82 of relay 18, conductor 49, contacts 38 of relay 16 to the other side of the source 1. When the circuit breaker 5 opens so that its auxiliary contacts 74 are closed the heretofore described circuit for control relay 12 to effect the closing of the circuit breaker 4 is completed.

When either circuit breaker is closed and an overload occurs on the load circuit 3, the overload trip coil of the closed circuit breaker is sufficiently energized to open the circuit breaker. As soon as the circuit breaker is open the heretofore described circuits are completed for the timing device 19 to cause it to reclose the circuit breaker which opened. If the overload is still connected to the load circuit when the circuit breaker is reclosed, it opens again and the timing device operates in the well-known manner to effect again the reclosure of the circuit breaker after it has been open a predetermined length of time.

If the overload is still connected to the load circuit so that the circuit breaker is open after being reclosed a predetermined number of times and the release magnet 21 is energized when the timing device reaches its lockout position, the projection 29 on the timer 25 moves into the groove 30 in the stop 27 and the timer is held in this position until the release magnet is reset by hand.

In the arrangement shown in Fig. 1 the preferred source is reconnected to the load source as soon as the voltage conditions of the preferred source are restored to normal. In some cases it may be desirable to delay the transfer of the load circuit back to the preferred source when it is reenergized until either the emergency source fails or the circuit breaker associated therewith is opened by an overload. This result may be obtained by the modification shown in Fig. 2. This modification consists in having the circuit breaker 5 complete through its auxiliary contacts 85 a locking circuit for the relay 17 when the circuit breaker 5 is closed. With such an arrangement reenergization of the relay 16 when the preferred source 1 is reenergized cannot effect the operation of the timing device because the relay 17 remains energized. In case, however, the voltage of the emergency source 2 fails or the circuit breaker 5 is opened by the operation of its overload trip coil 9, the relay 17 becomes deenergized and then the timing device 19 operates in the manner above described to reconnect the preferred source 1 to the load circuit.

Another feature of the modification shown in Fig. 2 is that a momentary failure of the voltage of the source 2, while the circuit breaker 5 is closed, does not effect the opening of the circuit breaker 5 and the closing of the circuit breaker 4. If the voltage of the source 2 is restored to normal before the timer 25 can operate in the manner heretofore described to effect the completion of the circuit of the trip coil 11 when source 2 fails, a circuit is completed for the control relay 17 through the contacts 35 of relay 15 and the auxiliary contacts 85 on the circuit breaker 5. As pointed out heretofore, the timing device 19 is inoperative to effect the opening of circuit breaker 5 and the closing of circuit breaker 4 when the control relay 17 is energized and the circuit breaker 5 is closed.

While we have in accordance with the patent statutes shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is:

1. In combination, a load circuit, two sources of current, a circuit breaker associated with each source for connecting it to said load circuit, means for effecting the opening of each circuit breaker when it is closed and a predetermined abnormal load condition occurs on said load circuit, and means for selectively closing said circuit breakers in accordance with the voltage of said sources and for reclosing the selected circuit breaker a predetermined number of times when it is opened in response to the operation of said opening means.

2. In combination, a load circuit, two sources of current, a circuit breaker associated with each source for connecting it to said load circuit, means for effecting the opening of each circuit breaker when it is closed and a predetermined abnormal load condition occurs on said load circuit, and means for closing one of said circuit breakers when its associated source is energized and for closing the other circuit breaker when its associated source is energized and the other source is deenergized and for reclosing each breaker a predetermined number of times with predetermined intervals of time between successive reclosures when it is opened by the operation of said opening means.

3. In combination, a load circuit, two sources of current, a circuit breaker associated with each source for connecting it to said load circuit, means for effecting the opening of each circuit breaker when it is closed and a predetermined abnormal load condition occurs on said load circuit, means for selectively closing said circuit breakers in accordance with the voltages of said sources, and a common timing means arranged to be operated in response to the opening of either circuit breaker by the operation of said opening means for effecting the reclosure of the respective circuit breaker after it has been open a predetermined length of time.

4. In combination, a load circuit, two sources of current, a circuit breaker associated with each source for connecting it to said load circuit, overload responsive means for effecting the opening of each circuit breaker when it is closed and a predetermined abnormal load condition occurs on said load circuit, a motor operated timer, and means associated with said timer and responsive to the voltages of said sources for effecting the operation of said timer to reclose one of said circuit breakers when its associated source is energized after the operation of said overload responsive means and to reclose the other circuit breaker when its associated source is energized and the other source is deenergized after the operation of said overload responsive means.

5. In combination, a load circuit, two sources of current, a circuit breaker associated with each source for connecting it to said load circuit, overload responsive means for effecting the opening of each circuit breaker when it is closed and a predetermined abnormal load condition occurs on said load circuit, a motor operated timer, and means responsive to the voltages of said sources and the positions of said circuit breakers for effecting the operation of said timer to reclose a predetermined one of said circuit breakers a predetermined number of times with predetermined time intervals between successive reclosures when the source associated with said predetermined circuit breaker is energized and to reclose the other circuit breaker a predetermined number of times with predetermined time intervals between successive reclosures when the source associated with said predetermined circuit breaker is deenergized and the other source is energized.

6. In combination, a load circuit, two sources of current, a circuit breaker associated with each source for connecting it to said load circuit, overload responsive means for effecting the opening of each circuit breaker when it is closed and a predetermined abnormal load condition occurs on said load circuit, a motor operated timer, and means responsive to the voltages of said circuits and the positions of said circuit breakers for effecting the operation of said timer to reclose one of said circuit breakers when the source associated with the other circuit breaker fails and to reclose said other circuit breaker when its associated source is energized and both of said circuit breakers are open.

7. In combination, a load circuit, two sources of current, a circuit breaker associated with each source for connecting it to said load circuit, means for effecting the openig of each circuit breaker when it is closed and a predetermined abnormal load condition occurs on said load circuit, and a motor operated timer arranged to be operated in response to the voltage of one of said sources and the position of its associated circuit breaker to effect the reclosing of said associated circuit breaker when it is opened by the operation of said opening means and to be operated in response to the voltage of the other source to effect the opening of the circuit breaker associated with said one of said sources and the closing of the other circuit breaker when said one of said sources fails and the other source is energized.

8. In combination, a load circuit, two sources of current, a circuit breaker associated with each source for connecting it to said load circuit, means for effecting the opening of each circuit breaker when it is closed and a predetermined abnormal load condition occurs on said load circuit, and a motor operated timer arranged to be operated in accordance with the voltage of said sources and the positions of said circuit breakers to effect the closing of one of said circuit breakers when its associated source is energized and the reclosing of said one of said circuit breakers when it is opened by said opening means and to effect the opening of said one of said circuit breakers and the closing of the other circuit breaker when the source associated with said one of said circuit breakers is deenergized and the other source is energized and to effect the reclosing of said other circuit breaker when it is opened by said opening means.

9. In combination, a load circuit, a source of current, a circuit breaker connecting said source to said circuit, a second source of current, a circuit breaker for connecting said second source to said circuit, means responsive to an overload on said circuit for effecting the opening of said first mentioned circuit breaker, a motor operated timer, means responsive to the opening of said first mentioned circuit breaker when said first mentioned source is energized for effecting the operation of said motor operated timer to effect the reclosure of said first mentioned circuit breaker after a predetermined time interval, and means responsive to the voltage failure of said first mentioned source when connected to said load circuit for effecting the operation of said timer to effect after a predetermined time the opening of said first mentioned circuit breaker and the closing of said second mentioned circuit breaker.

10. In combination, a load circuit, two sources of current, a circuit breaker associated with each source for connecting it to said circuit, means responsive to an overload on said circuit for effecting the opening of each of said circuit breakers when closed, a motor operated timer, means responsive to the opening of either of said circuit breakers in response to the operation of said overload responsive means for effecting the operation of said motor operated timer to effect after a predetermined time the closing of a predetermined one of said circuit breakers when both sources are energized, and means responsive to the voltage failure of the source associated with said predetermined one of said circuit breakers for effecting the operation of said timer to effect after a predetermined time interval the opening of said predetermined circuit breaker and the closing of the other circuit breaker.

In witness whereof, we have hereto set our hands this 27th day of April, 1927.

ARVID E. ANDERSON.
HERMAN BANY.